INVENTOR.
WILLIAM E. HENDRICKS
BY
ATTORNEY

Feb. 25, 1969

W. E. HENDRICKS 3,429,584

THREE-WHEELED VELOCIPEDE

Filed July 17, 1967

INVENTOR.
WILLIAM E. HENDRICKS

BY

*Robert E Brisbuthy*

ATTORNEY

INVENTOR.
WILLIAM E. HENDRICKS

BY Robert E. Breidenthal

ATTORNEY

Feb. 25, 1969 W. E. HENDRICKS 3,429,584
THREE-WHEELED VELOCIPEDE

Filed July 17, 1967

INVENTOR.
WILLIAM E. HENDRICKS

ATTORNEY 3,429,584
THREE-WHEELED VELOCIPEDE
William E. Hendricks, 614 S. Minnesota,
Wichita, Kans. 67211
Filed July 17, 1967, Ser. No. 653,698
U.S. Cl. 280—261         27 Claims
Int. Cl. B62k 9/02; B62l 1/00, 3/02

ABSTRACT OF THE DISCLOSURE

A tricycle vehicle having a rear driving wheel and forward dirigible wheels, a form fitting bucket type seat with relatively high sides and back rest mounted so that a rider's weight is approximately equally distributed on the wheels, a plurality of means being provided for steering including an upstanding lever movable to the right and left to effect endwise movement of a tie rod connected to knuckles on the stub axles of the front wheels and the seat being oscillatably mounted on a vertical axis and operatively coupled to the tie rod and the steering lever to effect steering action on oscillation thereof. One of the steering arrangements couples a pivoted handle bar to the tie rod by structure including a rock shaft and a link.

The vehicle includes a driving, foot pedal driven, sprocket at the forward end of the vehicle and ahead of the dirigible front wheels in an arrangement such that the rider is seated at a relatively low position relative to his feet. A chain drive is provided from the driving sprocket to a driven sprocket at the rear wheel, the extent of the vehicle frame between the seat and the driving sprocket being adjustable to suit the rider's leg length.

The driven sprocket is operatively connected to the rear wheel as is conventional in bicycles whereby the vehicle can be driven forwardly, allowed to coast and to be braked.

A brake shoe or drag brake is provided forwardly of the centers of the front wheels and is movable downwardly by toggle link means into ground contact whereby nearly the entire weight of the vehicle is borne by the shoe and the rear wheel. The opposite upward force of the drag brake augments the braking force of the rear wheel, as the ground contact positions of the front wheels act as a fulcrum. The brake shoe is lever actuated, and such lever can be locked in such a position that the shoe is engageable with the ground so as to curtail unauthorized use or theft of the vehicle.

This invention pertains to new and useful improvements in three-wheeled vehicles of the tricycle type employing a pair of dirigible front wheels and a driven rear wheel, and more particularly relates to improved means for steering, braking, and prevention of theft thereof, as well as in improved geometry with respect to weight distribution on the wheels and obtaining a low center of gravity.

Numerous vehicular structures have heretofore been proposed of some degree of interest to the general field of subject matter to which the present invention pertains. Examplary of such prior proposals are the disclosures set forth in the following United States Letters Patent:

2,884,259, Snodgrass, Apr. 28, 1959; 2,481,683, Polacek, Sept. 13, 1949; 1,500,809, Giufri, July 8, 1924; 3,208,764, Holland, Sept. 28, 1965; 1,288,809, Benson, Dec. 24, 1918.

It has been found that none of the prior art proposals has in all respects been entirely satisfactory (notwithstanding numerous merits that they possess), and this has been found to be particularly true with respect to provisions made as to the safety and reliability of means for braking the vehicle, convenience and flexibility of steering systems, and human engineering factors such as having to do with comfort, efficient application of human effort to effect mechanical work with minimum fatigue, and so forth.

It is the primary object of this invention to provide a tricycle type vehicle having a single rear driving wheel such that the center of gravity of the rider and vehicle is low in relation to the wheel heights, with the weight carried by each of the wheels being approximately equal, and wherein the rider can thrust in a primarily horizontal direction with his feet in order to effect propulsion.

It is another important object of this invention to provide a vehicle of the general character specified above wherein substantially the entire weight of the rider and vehicle can be applied against a supporting road surface in obtaining braking traction.

It is still another paramount object of the subject invention to provide a vehicle of the general character specified above such that substantially the entire weight of the vehicle and its rider can be applied for braking traction, and which braking force will be in longitudinal alignment with the center of gravity and the rear wheel so as to minimize any possibility of a turning torque.

It is yet another important objective of the subject invention to provide a vehicle of the general character specified such that a brake can be set to prevent movement of the vehicle when the latter is parked. Also it is a closely related object of the invention that such brake be such as not to subject wheel spokes to any possibility of damage and which brake can be releasably locked in such set condition as a security measure against unauthorized riders or theft.

Still another important object is to provide a vehicle of the character specified which will enable the rider to steer by either twisting his body in the seat or by operation of a steering control, or both, and which will in either case operate to cause the seat to face in generally the direction that the vehicle is steered.

A further object of this invention is to provide a vehicle of the character specified which is readily adaptable to include a prime mover (small gasoline engine or electric batteries and motor) in the same general manner as conventional bicycles are motorized.

A final object to be specifically enumerated is to provide a vehicle of the general character specified, which will be rugged, durable, reliable and safe in use, and yet which will lend itself to economic manufacture and maintenance.

A broad aspect of the invention involves, in a tricycle vehicle of the type comprising a frame, freely rotatable laterally spaced front wheels dirigibly mounted by pivotally secured stub axles on the frame, a rear wheel centrally mounted on the rear of the frame, a forwardly facing rider seat mounted on the frame, rider actuated means for driving the rear wheel, and rider actuated means for steering the dirigible front wheels; the improvement comprising the frame centrally projecting forwardly of the stub axles, said means for driving the rear wheel comprising a driven sprocket coaxial with and operatively connected to the rear wheel, a driving sprocket rotatably mounted on the forward extremity of the frame, said driving sprocket being provided with foot pedal cranks, a drive chain entrained over the sprockets, and a brake shoe pivotally connected for vertical movement in depending relation to the frame at a position forwardly of the stub axles, means for actuating and controlling the vertical position of the brake shoe, said frame including an upstanding central portion disposed at a position rearwardly of the driving sprocket, and a handle bar carried at the upper end of the upstanding portion of the frame.

Another broad aspect of the invention is a vehicle having a very low center of gravity comprising a frame of generally cruciform configuration relative to the horizontal plane, said frame including an elongated longitudinally extending central portion having fixed thereto, at a position intermediate its longitudinal extent, an elongated transversely extending cross portion, said central portion being substantially shorter than the center portion, stub axles pivoted to the transverse extremities of the cross portion of the frame for swinging movement about vertical axes, a pair of front wheels mounted on the stub axles, said stub axles each being provided with a steering knuckle and a transversely extending tie rod having its opposite end pivotally connected to the steering knuckles in an arrangement such that steering of the front wheels is effected by endwise movements of the tie rod relative to the frame, a rear wheel rotatably mounted on the rear extremity of the center frame, a driven sprocket coaxial with the rear wheel and operatively connected thereto, a driving sprocket rotatably mounted on the forward extremity of the center frame, an endless chain entrained over said sprockets, said driving sprocket being provided with pedal cranks, an upstanding column mounted on the center frame forwardly of the cross portion of the frame, such column being provided with a handle bar at its upper end, a forwardly facing seat mounted on the center frame at a position rearwardly of the cross portion of the frame, said front and rear wheels being of approximately equal diameters and having their centers at or near the apices of an isosceles triangle, and means for enabling a vehicle rider to effect endwise steering movement of the tie rod. This configuration permits the minimum spacing of front wheels, minimum wheel-base length and consequently, minimum weight and materials with optimum strength, lightness and optimum maneuverability.

The wheel location geometry is relatively critical in that if the front wheel spread (or tread) width exceeds to any marked degree the distance from the center line of the front axle to the center line of the rear axle (wheel base), the directional control is adversely affected when one of the front wheels strikes a bump or hole. This will tend to "ground loop" the vehicle because the effective lever arm to the rear wheel has been shortened beyond its practical limits. Conversely, if the wheel base to any marked degree exceeds the width of the wheel tread, more difficulty is encountered in that to obtain adequate traction and braking on the rear wheel would necessitate moving the seat rearwardly. This causes diminution in lateral stability and encounters a human factor problem because the heels of the rider will soon begin to foul on the front axle. Therefore, the configuration shown and explained, with the wheels at or near the apices of an isosceles triangle, is ideal both from a mechanical and human standpoint. Any wide departure therefrom is not feasible for a vehicle of this type.

A very important aspect of the invention resides in the provision of a lever and toggle link actuated brake shoe, the lever being operatively so connected to the toggle link so that the shoe can be forced into frictional ground contact to such an extent as to tend to raise or greatly reduce the pressure of ground contact of the front wheels.

Yet another important aspect of the invention involves the seat (preferably of the bucket type) being pivotally mounted on a vertical axis and such seat being operatively coupled to a steering lever.

An important feature of the invention resides in the coupling of a steering lever to a pivotally mounted seat and their operative connection to dirigible ground wheels in an arrangement such that movement of the lever to the right is accompanied by the seat and the dirigible wheels turning to the right, and vice versa.

An important feature resides in a lever actuated brake shoe directly engageable with the ground surface; the brake shoe being mounted for downward swinging movement and connected to the frame by a toggle link, the actuating lever being pivoted to the frame and coupled by a link to the center pivot of the toggle link.

These and many other objects, aspects and features of the invention will manifest themselves during the ensuing description of preferred embodiments of the invention taken together with the accompanying drawings, wherein:

Referring now to the drawings, wherein like numerals designate like parts throughout the various views, and initially directing attention to the embodiment of the invention illustrated in FIGURES 1 through 7 the vehicle of this embodiment of the invention is designated generally by the reference numeral 10.

The vehicle 10 comprises a frame 12 that in top plan view is generally of a cruciform configuration including a longitudinally extending central portion 14 and a transversely extending cross portion 16, the cross portion 16 being disposed at a position intermediate the longitudinal extent of the central portion 14. The longitudinally extending central portion 14 of the frame is comprised of a vertical tubular member 18 from the upper and lower ends of which rearwardly extend rigidly attached converging frame members 20 and 22. The rearmost portions of the frame members 20 and 22 are bifurcated or forked in configuration (as indicated at 24 in FIGURE 3) for receiving a drive wheel 26 of the vehicle 10. The rearmost ends of the bifurcated or forked frame members 20 and 22 converge and are rigidily secured to each other on opposite sides 28 and 30 of the axial portion of the rear or drive wheel 26. The axle 32 of a conventional forward drive, coasting and braking assembly designated generally at 34 extends between and is connected to the rearmost converged portions 28 and 30 of the frame members 20 and 22. It will be understood that the assembly 34 is such as that conventionally employed in connection with the rear wheels of bicycles such as to include a driven sprocket 36 coaxial with the wheel 26, and by means of which sprocket 36 the rear wheel 26 can be directly driven in a forward direction; the rear wheel 26 can freewheel or coast when no rotation is imparted to the driven sprocket 36; and such that the rear wheel 26 is braked against rotation when a torque is delivered to the driven sprocket 36 in a direction opposite to the direction in which the same is turned on driving the wheel 26 in a forward direction.

The central portion 14 of the frame additionally includes a forwardly extending member 38 rigidly attached to the upper end of the tubular member 18, and the cross portion 16 of the frame 12 underlies the frame member 38, and the cross portion 16 is at its midpoint rigidly secured, as by welding or the like, to the frame member 38. A pair of brace members 40 and 42 have their forward ends rigidly attached as by welding or the like to the cross portion 16 adjacent one end of the latter, as indicated at 44, and the braces 40 and 42 are rearwardly divergent and have their rearmost extermities rigidly secured, as by welding or the like, respectively secured to the tubular frame member 18 adjacent the upper and lower ends thereof. Similarly, a pair of brace members 46 and 48 have their forward ends rigidly attached to the cross member 16 adjacent the other end of the latter, and have their rearmost ends respectively connected, as by welding or the like, to the upper and lower ends of the tubular frame member 18.

Additionally, the frame 12 includes as a part of the central portion 14 thereof a frame member 50 having its forward end rigidly attached to the midpoint of the cross member 16 on the underside of the latter, and the frame member 50 has its rearmost extremity rigidly attached to the lower end portion of the tubular member 18 intermediate the rearmost extremities of the braces 42 and 48.

It will be noted that the frame members 18, 20, 22, 38 and 50 are disposed in the vertical longitudinal or medial plane of the vehicle 10, and that such elements of the frame 12 are so proportioned that the midpoint in the vertical extent of the tubular member 18 is substantially below the horizontal plane defined by the axle 32 of the rear drive wheel 26, such relationship being established for the two-fold purpose to reduce the height of the position occupied by a seat 52 carried by the vertical tubular member 18, and to establish such a vertical extent of the frame 12 so as to provide a strong and lightweight truss-like structure.

It is much preferred that the seat 52 be of the bucket type including a sturdy back and upstanding sides. As will be brought out presently the fore and aft location of the seat 52 is such that the weight of the rider (positioned on the seat 52 and disposed to propel the vehicle) plus the weight of the vehicle is about equally distributed or carried by the three wheels, and the form of the frame 12 and the vertical location of the seat 52 is such that the center of gravity of the combined vehicle and rider is very low in relation to both the width and the wheel base of the vehicle.

Stub axles 54 and 56 are pivotally mounted respectively at 58 and 60 at the opposite ends of the frame cross member 16, the pivotal axes of the connections 58 and 60 being substantially vertical and equally spaced on opposite sides of the central frame structure 14. Front, dirigible wheels 62 and 64 are secured and rotatably mounted upon the stub axles 54 and 56. The wheels 62 and 64 are preferably of the same diameter as the rear wheel 26, and wheel diameters in the range of about 20″ to about 24″ for adults and 16″ and under are well suited for juveniles and toys, though the invention is not necessarily limited to such range of wheel diameters, and it is deemed important, as will be evident on inspection of FIGURES 2 and 3, that the centers of the wheels 26, 62 and 64 lie in a horizontal plane and define the apices of an isosceles triangle with the angles at the centers of the wheels 62 and 64 being equal. It is especially preferred that the apex angle of the isosceles triangle defined at the center of the rear or driving wheel 26 be about 53°, and preferably within the range of about 48½° to about 58½°. Angles outside such stated range result in marked deterioration of performance and in undesirable instability. For example, when the tread width of the vehicle or the spacing of the centers of the front wheels is 28″, the wheel base of the vehicle is most desirably 28″ and preferably should be between about 25″ to about 31″.

It will be readily apparent that the vertical tubular member 18 lies along the median of the triangle from the center of the wheel 26, and it is deemed very important that the tubular member 18 be no further forward than the centroid of the triangle of such median. More specifically, the tubular member 18 or the center of the seat 52 are preferably disposed no further forward than the midpoint of the median, and it is especially preferred that they be positioned rearwardly of the midpoint as far as the wheel 26 will permit. In any event, it is preferred that, considering the longitudinal position of the seat 52 with respect to the vertical tubular member 18, that the approximate position of the combined center of mass of the vehicle and a rider seated upon the seat 52 will be disposed so the total weight is distributed about equally to the three wheels. The importance of such disposition of the center of mass of the rider will be subsequently described in greater detail.

Figure 3:
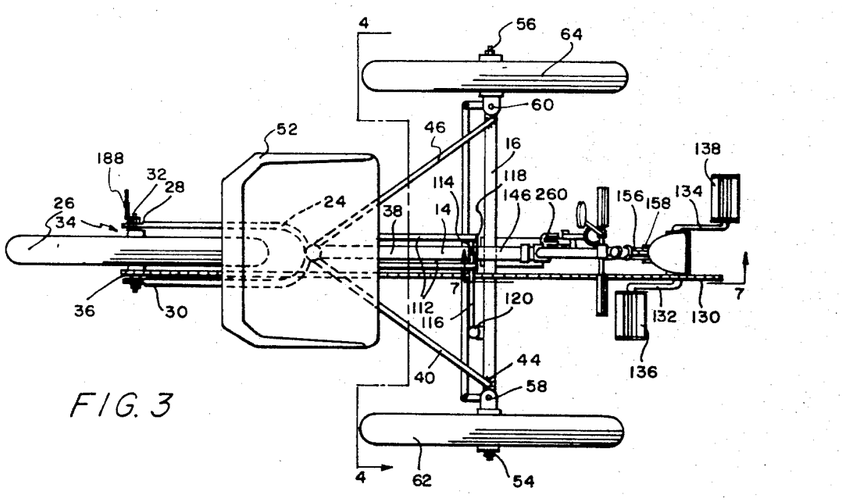
FIGURE 3 is a top plan view of the vehicle, certain hidden details being shown in dashed outline.
Figure 4:
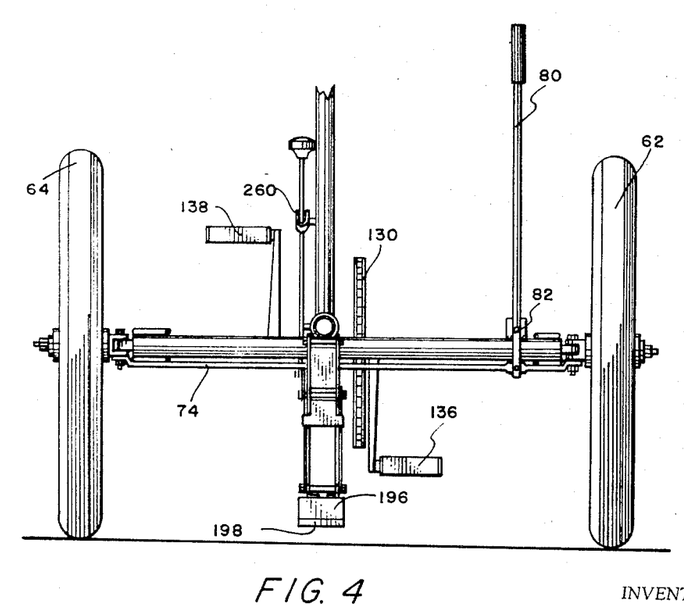
FIGURE 4 is a vertical sectional view taken upon the broken section line 4—4 in FIGURE 3.

Means is provided for steering the front wheels 62 and 64, such means comprising steering knuckles 66 and 68 rigidly fixed to, as by welding or the like, and extending preferably rearwardly from the yoke structures 70 and 72, respectively, which pivotally connect the axles 54 and 56 to the frame member or fixed front axles 16. A tie rod 74 is disposed rearwardly of and in parallelism to the frame member 16, and the steering tie rod 74 has its opposite ends pivotally connected to the rearmost extremities of the steering knuckles 66 and 68, respectively, as indicated at 76 and 78. The arrangement is such that the steering tie rod 74 is movable endwise with movement of the steering tie rod 74 to the right as viewed from above causing corresponding anticlockwise movements of the stub axles 54 and 56 about their respective pivots 58 and 60 so as to effect such movement of the dirigible wheels 62 and 64 as to turn to the left. In a corresponding manner endwise movement of the tie rod 74 to the left will result in turning movement of the dirigible wheels 62 and 64 to turn the vehicle to the right. When the tie rod 74 occupies a position intermediate its range of endwise movement, the dirigible wheels 62 and 64 are disposed as shown in FIGURE 3 with the vehicle 10 being steered directly straight ahead. It will be obvious to those skilled in the art that the steering arrangement thus far described is such that stub axles 54 and 56 are in axial alignment when the vehicle 10 is steered straight ahead, and such stub axles remain in or near to parallelism with each other when the vehicle 10 is steered to the right and to the left.

An upstanding steering lever 80 is pivotally connected at 82 for movement about a horizontal longitudinally extending axis to an L-shaped bracket 84, such bracket 84 being welded or otherwise suitably secured to the fixed axle or frame member 16 at a position adjacent the right hand end of the latter. The steering lever 80 is preferably formed of tubular steel and is fitted with a rubber hand grip 86 at its upper end by means of which the vehicle rider may readily oscillate the steering lever 80 from its vertical position in a transverse direction about the pivotal axis defined at 82. The lower end portion of the tubular steel steering lever 80 is flattened so as to seat flush against the bracket 84 in the region of the pivot 82. The steering rod 74 is also preferably made of tubular steel and is flattened for a short interval of its extent adjacent its right end as indicated at 88, and the flattened extent 88 of the steering tie rod 74 is seated flush against the flattened lower end portion 90 of the steering lever 80, and a pivot pin 92 extends through aligned apertures in the flattened extent 88 of the steering tie rod 74 and the flattened extent 90 of the steering lever 80. The arrangement is such that movement of the handle 86 to the right causes endwise movement of the steering tie rod 74 to the left with the result that the vehicle 10 is turned to the right. Conversely, movement of the handle 86 to the left causes a steering of the vehicle 10 to the left. Such steering of the vehicle to the right on movement of the handle 86 to the right, and vice versa, is the result of the pivotal connection 92 being below the pivotal connection 82 and by reason of the steering knuckles 66 and 68 extending rearwardly of the stub axles 54 and 56.

If desired or deemed expedient, the aperture in the flattened portion 90 of the steering lever 80 through which the pivot pin 92 extends can be elongated vertically to accommodate for the amount of vertical motion made by the lower end of the steering lever 80 on oscillation of the lever 80 about its pivot 82. It will be noted that the spacing of the steering tie rod 74 from the fixed axle or frame member 16 varies to some extent during endwise movement of the steering tie rod 74. Such varying in the spacing of the tie rod 74 from the frame member 16 is compensated for by the lower flattened portion 84 of the lever 80 being somewhat flexible insofar as forward and rear movement of the lower end extremity thereof. Such flexibility of the lower end portion of the steering lever 80 coupled with a small degree of flexibility of the steering tie rod 74 and a minor degree of play about the pivot 82 prevents any binding and enables a smooth control of steering by use of the steering lever 80. The length of the steering lever 80 in relation to the spacing of the pivotal connections 82 and 92 affords a great mechanical advantage that positive steering control of steering by the rider is enjoyed at all times.

Figures 5, 6:
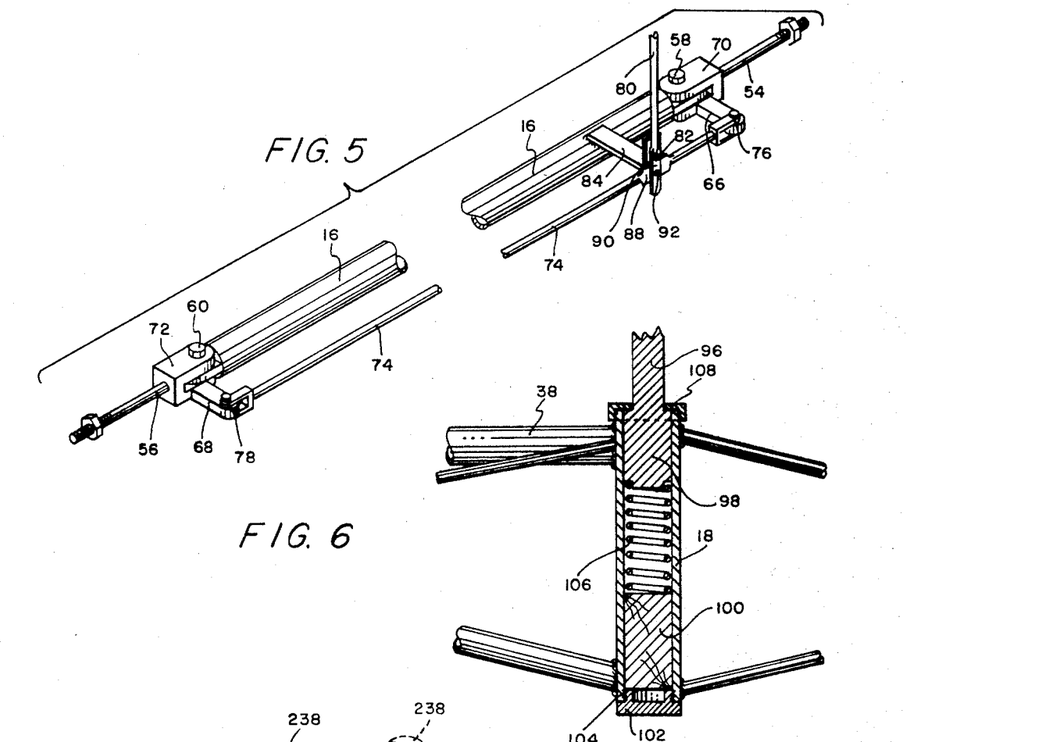
FIGURE 5 is an enlarged, broken, isometric detail view of steering linkage employed in the vehicle shown in the preceding figures.
FIGURE 6 is an enlarged fragmentary detail view, partially in vertical section, of seat mounting structure.

The vehicle 10 is additionally provided with an alternative steering means for effecting endwise steering movement of the steering tie rod 74, such alternative means being such as to be employed in lieu of or to supplement the steering control such as effected by use of the handle 86. Whether such alternative steering means is employed in lieu of or to supplement steering control as may be effected by use of the handle 86, such alternative steering means assures the seat 52 and the rider resting thereon being caused to face generally in the direction towards which the vehicle 10 is being steered. Such alternative steering means comprises the seat 52 being mounted for oscillation about a vertical axis, and for this purpose the seat 52 is provided with a depending support member 96 fixed rigidly thereto, and the lower end portion 98 of the support member 96 is reciprocably and rotatably received within the tubular frame member 18 as best shown in FIGURE 6. A cylindrical wooden plug 100 of a length selected to accommodate different sized riders is removably received within the lower end portion of the tubular member 18, and such plug 100 is removably retained within the tubular member 18 by means of a metal plug 102 threaded into the lower end of the tubular member 18 as indicated at 104. A compression spring 106 is received within the tubular member 18 and has its opposite ends seated against the lower end of the support member 98 and the upper end of the removable plug 100 as shown in FIGURE 6. The spring 106 is of such dimensions and strength as to be under compression when the seat 52 is unoccupied by a rider, and will serve to yieldingly support the seat 52 and a rider seated thereon in a resilient fashion. The enlarged lower end portion 98 of the support member 96 is removably received within the tubular member 18 and is releasably restrained against upward removal from the frame member 18 by means of a cap 108 threaded upon the exterior of the upper extremity of the tubular member 18.

From the foregoing it will be seen that the seat 52 is provided with resilient support, and that the seat 52 is oscillatable about the vertical central axis of the tubular member 18.

Figure 1:
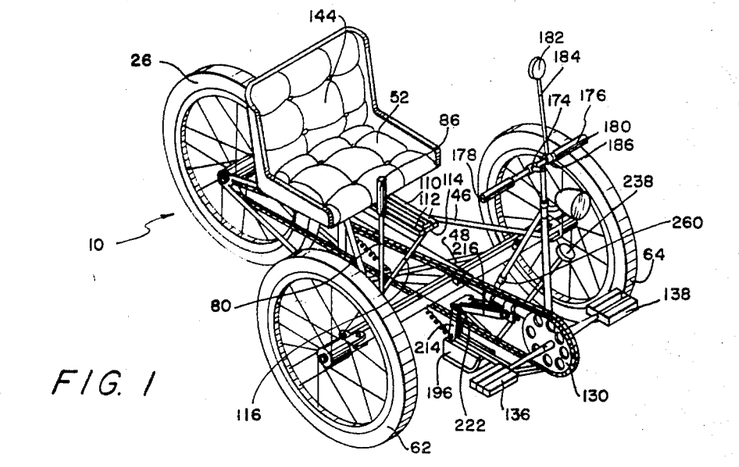
FIGURE 1 is an isometric view of the vehicle.

As best shown in FIGURE 1, the bottom portion of the seat 52 is provided with a rigidly connected forwardly extending portion 110. The portion 110 is centrally positioned with respect to the seat 52 and has such a small transverse extent as to be disposed between and below the legs of a perseon seated upon the seat 52. The forwardly projecting portion 110 of the seat 52 is constituted of two parallel spaced elements 112 which are connected by a cross piece 114 at their forward end. A steering link 116 has one end pivotally connected at 118 to the cross piece 114, and thence extends transversely to the right to have its other end pivotally connected at 120 (see FIGURE 3) to the steering lever 80 at a position spaced above the previously described pivotal connection 82. The arrangement is such that a clockwise oscillation of the seat 52 about the axis of the tubular member 18 as viewed from above moves the handle 86 to the right and results in shifting the steering tie rod 74 so as to turn the vehicle 10 to the right. Conversely, anticlockwise oscillation of the seat 52 effects steering of the vehicle 10 to the left. The extension 110 can be eliminated if desired, if only being essential that the steering link 116 is coupled to the seat 52 in such a manner that oscillation of the latter will effect the described movement of the lever 80 and tie rod 74.

From the foregoing it will be evident that the rider of the vehicle 10 can by simply twisting his body oscillate the seat 52 in such a manner as to control the steering of the vehicle 10. Steering thus effected can be in lieu of or supplemented by manual application of force to the handle 86. Whether steering is accomplished by the seat 52 or the handle 86, or both, the seat 52 is in any event caused to face toward the direction generally in which the vehicle 10 is being steered. Structure will subsequently be described whereby it will be evident that the rider of the vehicle 10 can easily effect the twisting motion of his body or tongue necessary to cause the amount of oscillation of the seat 52 necessary to control the steering.

Means is provided for driving the rear sprocket 36 of the assembly 34. Such means comprises the extreme forward end of the forwardly extending frame member 38 being provided with a hollow transverse socket member or crank hanger 126 in which is rotatably mounted the axle or shaft of a sprocket 130. The mounting of the shaft 128 in the socket 126 and the character of the sprocket 130 is such as is conventional in bicycles, and in the same conventional manner radially oppositely extending pedal cranks 132 and 134 are fixed to the opposite ends of the shaft 128, the sprocket 130 being disposed on the right hand side of the frame member 38 and in close proximity to the pedal crank 132. The radial outer extremities of the pedal cranks 132 and 134 are respectively provided with rotatably mounted, conventional foot pedals 136 and 138, whereby the feet of a rider seated upon the seat 52 can by use of his feet on the pedals 136 and 138 apply at his selection a forward or reverse torque to the axle 128 and the sprocket 130 fixed to the shaft 128. The pedal crank or driven sprocket 130 is coplanar with the driven sprocket 36 of the rear wheel assembly 34, and an endless chain 140 is entrained over the sprockets 36 and 130. Accordingly, a rider on the seat 52 can by use of his feet on the pedals 136 and 138 cause the sprocket 130 to rotate in a clockwise direction as viewed in FIGURE 2, and thereby (through the chain 140 and the driven sprocket 36 of the assembly 34) cause clockwise or forward rotation of the rear wheel 26 so as to drive the vehicle 10 forwardly. At his election, the rider of the vehicle 10 can simply cease causing forward rotation of the driving sprocket 130, wehreupon the vehicle 10 will simply coast by virtue of the well known function of conventional bicycle-type rear wheel driving assemblies or coaster brake units 34. When the rider desires to brake rotation of the rear wheel 26 and thereby retard forward motion of the vehicle 10 by virtue of the traction of the rear wheel 26 with the ground surface 142, the rider simply uses his feet to actuate the pedals 136 and 138 so as to produce a torque on the driving sprocket 130 in an anticlockwise direction, such rearward torque being transmitted by the endless chain 140 to the driven sprocket 36 so as to cause the assembly 34 to brake the rear wheel 26.

In the preferred construction, the crank hanger 126 should be located as low as possible to the ground line, the only limitations being ground clearance for the rider's feet at the bottom of the pedal cycle and the "kneeling camel" function subsequently to be described. When the crank height has been established by this rule, the seat height is governed by certain human and mechanical limitations: If the bucket seat is located too high in relation to the crank, there is not only a marked diminution in lateral stability (due to higher center of gravity) but the resultant upward force generated by the rider's thrust on the pedals tends to lift the rider's posterior off the seat upwardly, negating the seat back's ability to act as a firm anchor to augment greater muscular effort on the pedals. Still another limitation if the seat is too high in relation to the crank hanger lies in the fact that the comfort value of the bucket-type seat is lost because the rider's legs on the downward stroke begin to foul the front edge of the seat. Conversely, if the bucket seat is located too low in relation to the crank hanger, more difficulty arises. While the lower seat may add somewhat to lateral stability, this relationship poses an interesting human engineering problem. It should be noted that the human leg is a human mechanical toggle motivated by very powerful intrinsic muscles. However, moving the legs up and down when they are extended horizontally from the body in a sitting position, e.g., is quite a different matter, for such up and down movement is possible only by use of the comparatively weak extrinsic leg muscles.

Therefore, assuming a crank-seat-height relationship in which the rider's feet are approximately horizontal to the bottom of the seat when at the top of the stroke means that the weight of the leg has at least partially been lifted by these weaker extrinsic muscles and that inordinately accelerated fatigue will result.

Moreover, in this relationship, when the top pedal is rotated on over until it has reached dead center (a line passing through the center line of the pedal pin and the center line of the crank hanger and the center line of the rider's hip socket would be a straight line), with the rider's leg fully extended he can exert only a very feeble downward force on the pedal to add to his leg weight to move the crank downwardly past dead center. This is particularly bad when starting from a dead stop with the crank on dead center. It will thus be seen that there are definite limitations to seat and crank hanger heights in relation to each other—both human and mechanical.

With the crank hanger located as low as possible, and still giving ground clearance for the rider's feet, the optimum location of the bucket seat in relation to the cranks is to locate the seat height so that when the rider's leg is extended and on "dead center" his leg will be inclined downward to a degree so as to enable the rider to exert sufficient downward force on the extended pedal to cause the crank to rotate on past "dead center" with a force enabling the rider to start on dead center on normal terrain from a dead stop. This downward force on the pedals can be easily augmented by the rider leaning his body forward and pulling up on the handle bar. This optimum location of the bucket seat in relation to the crank hanger enables the rider, for the first time with a crank drive to obtain continuous, overlapping power without even an instantaneous dead center and enables the rider under normal conditions, to start regardless of the position of the foot pedals. Obviously, in order to maintain the desirable seat-crank-height relationship, it is necessary to raise the seat slightly higher for taller riders.

Means is provided to adjust the spacing between the axle 128 and the seat 52 so as to accommodate riders of differing leg lengths. While of course it would be possible to make some provision for forward and rearwardly adjustment of the seat 52, such is not preferred as such adjustment would have to be made in such a manner as to not disturb adjustment of the means by which steering is effected by turning movement of the seat 52, and for the further reason that forward and rearwardly adjustment of the seat 52 would disturb maintaining the center of gravity at its desired position with respect to the longitudinal extent of the vehicle 10. Therefore, rather than making provision for forwardly and rearwardly adjustment of the seat 52, provision is made for making forwardly and rearwardly adjustment of the position of the axle 128. Such provision takes the form of the frame member 38 being constituted of two sections, namely, a relatively larger tubular section 146 fixed to and rigid with respect to the vertical frame member 18 and the frame member 16, and a relatively smaller section 148 slidably received within the forward end of the section 146 so as to be extensible therefrom to an adjustable extent. The forward extensible section 148 is fixed to and rigid with respect to the socket structure 126 at its forward end. The forward end portion of the frame section 146 is provided with a longitudinally extending slot or slots, not shown, at its forward end, whereby a clamp 150 embracing the slotted forward end portion of the frame section 146 and the frame section 148 disposed therein will cause the frame section 146 within the clamp 150 to flex radially inwardly and frictionally engage the frame section 148 so as to secure the section 148 in adjusted extended position. The clamp 150 is in the form of a split collar which can be releasably tightened into clamping engagement by means of a nut and bolt structure indicated at 152. It will of course be understood that when adjustment is made of the degree of extension of the section 148 that the same is positioned so that the sprocket 130 is coplanar with the driven sprocket 36 prior to tightening of the clamp 150.

It will be understood that the drive chain 140 is of conventional character and preferably such as that conventionally employed in bicycles. Those familiar with the art will appreciate that adjustment of the degree of extension of the frame section 148 affects the spacing between the sprockets 130 and 36, and the conventional bicycle-type drive chains can be readily modified in length by adding to or removing links from such chain 140. It has been found that it is simpler and usually quite satisfactory to make adjustment of the chain length rather than to provide a spring loaded idler wheel or the like. Usually, it takes only a few minutes to add or remove an appropriate number of chain links.

While chain guards or chain shields can be provided to positively prevent a rider or his clothing coming into contact with the chain 140, such has not been found to be necessary in connection with making many tests with an actual working model constructed in accordance with the vehicle 10. It will be noted that the chain 140 is disposed in close proximity to the medial vertical plane of the vehicle 10, and that considerable protection for the rider and his clothing is afforded by the upper and lower flights of the chain 140 passing beneath the steering link 116 as well as the frame members 20 and 40.

Figure 2:
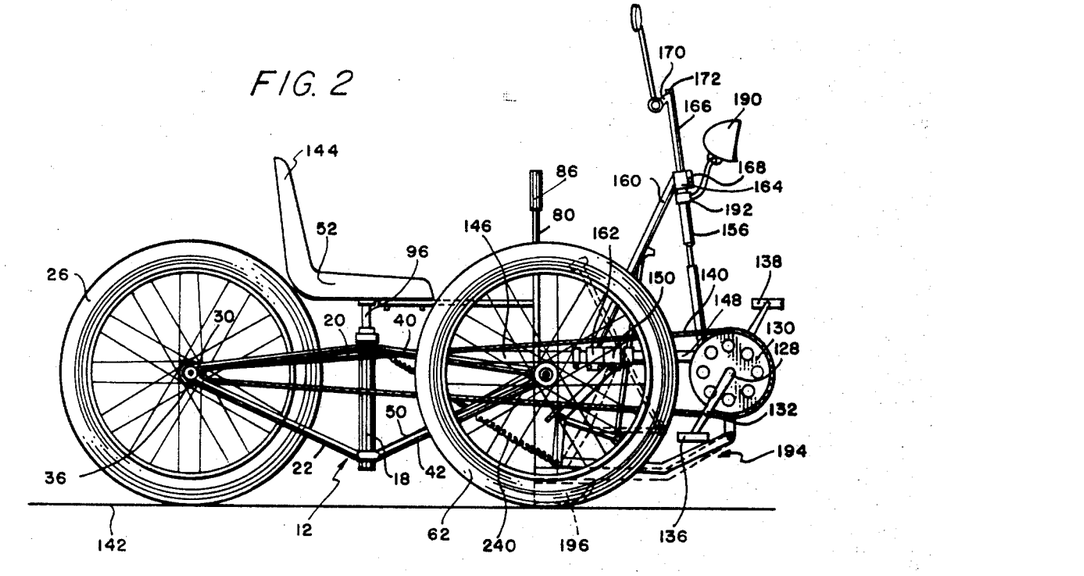
FIGURE 2 is a side elevational view of the vehicle, an alternative position of the brake shoe system being shown in dashed outline.

The vehicle 10 includes an upstanding handle bar support structure comprised of an upstanding member having its lower end adjustably clamped by a clamp 158 upon the extensible section 148 of the frame structure 38. The clamp 158 is of the split collar type and is forwardly and rearwardly slidable upon the frame section 148 and includes a nut and bolt, not shown, by means of which the member 156 can be releasably secured in adjusted position. The member 156 extends upwardly from the frame section 148 and is inclined preferably to the rear as best shown in FIGURE 2. The member 156 is provided with a brace 160, such brace 160 having its upper end rigidly secured, as by welding or the like, to the upper end of the member 156 and extends downwardly and rearwardly therefrom, and is provided with a releasable clamp 162 at its lower end detachably secured at a selected position along the extent of the section 146 of the frame 18 rearwardly of the clamp 150. The clamp 162 is preferably of the split collar type including a nut and bolt, not shown, whereby the clamp 162 can on the tightening of such nut and bolt be tightly engaged about the frame section 146. Thus, the inverted V structure constituted by the column 156 and the brace 160 can be forwardly and rearwardly adjusted by means of the clamps 158 and 162.

The upper end portion 164 of the support or column 156 is tubular and slidingly receives therein a post 166. The vertical extension of the post 166 from the support column 156 is selectively fixed by means of the upper end portion 164 being slotted or formed as a split collar which may be tightly clamped about the post 166 by means of a nut and bolt indicated at 168.

A rearwardly extending mounting bracket 170 is detachably secured to the upper end of the post 166 by means of a cap screw 172, and the rear end of the bracket 170 is formed as a split clamp 174 in which the central portion of a transversely extending handle bar 176 is adjustably secured. While the handle bar 176 can be of any conventional configuration such as employed in connection with bicycles and motorcycles, the same may conveniently be in the form of a short straight piece of stiff tubing having handle grips 178 and 180 at its opposite ends. The split clamp 174 and the bracket 170 of which it forms a part are such as conveniently employed in connection with the handle bars of bicycles or motorcycles, and affords a convenient means whereby the personal preference of the user of the vehicle 10 can be satisfied with respect to the configuration of the handle bar 176 used.

It is to be noted that whereas the forward and rearwardly position of the handle bar 176 is adjustable by the previously described use of the clamps 158 and 162 and the vertical height being adjustable by means of the clamp of which the nut and bolt 168 form a part, it is to be particularly noted that when the clamps are tightened to secure the handle bar 176 in desired adjusted position, the position of the handle bar 176 remains fixed with respect to the frame of the vehicle 10. Accordingly, the handle bar 176 constitutes a firm anchoring position for the rider of the vehicle 10 so as to enable the rider by use of the strength of his arm and back muscles to augment the force applied by his legs and feet against the pedals 136 and 138, and in addition constitutes a stable anchor by means of which he can twist his body and therefore also the seat so as to positively and with nice degree of control steer the vehicle 10. The rider can exercise such control with either one or both of his hands on the grips 178 and 180, or alternatively with one hand on the handle bar grip 180 and the other hand on the steering lever grip 86. It is believed obvious that if desired the steering lever 80 can be disposed on the left hand side of the vehicle 10 rather than on the right hand side as shown; however, it is believed that inasmuch as most people are righthanded and inasmuch as most riders prefer to control steering by means of the hand with which they possess the greatest dexterity, the position of the steering lever 80 should be disposed as shown in the drawings. Positioning of the steering lever 80 at the righthand side of the vehicle does not preclude use of the vehicle 10 in the form illustrated by lefthanded people. But merely imposes a slight additional difficulty of such riders, and such learning difficulty can be soon surmounted with acquiring a minor amount of operating experience.

For reasons of safety, a rear view mirror 182 of conventional adjustable character is provided, the same being positioned atop a support arm 184 that has its lower end detachably secured to the handle bar 176 by a clamp 186. The support arm 184 is of sufficient length so that the body of the rider does not obstruct a clear view to his rear. Also for reasons of safety and to enable utilization of the vehicle 10 during the hours of darkness, a large red reflector button 188 is mounted on the left end of the axle 32, and a battery powered headlamp 90 of conventional character is mounted on the support column 156 by a clamp 192 disposed below the position at which the brace 160 is attached to the support column 156.

As previously described, the rider of the vehicle 10 can effect a braking action of the vehicle 10 through the use of the pedals 136 and 138 in the same manner as with conventional bicycles, such braking action being by the retardation of rotation of the rear wheel 26 and the traction of the rear wheel 26 with the ground surface 142. Such braking action effected through the rear wheel 26 is normally sufficient for most driving situations, and it will be noted that steering action by means of the two front dirigible wheels 62 and 64 is substantially if not entirely unaffected by the braking of the rear wheel 26. However, optimum braking action such as may be urgently necessitated upon encountering extreme emergency situations cannot be effected solely by braking the rear wheel 26 for several reasons, the most important of which resides in the fact that the traction forces which may be caused to exist between the rear wheel 26 and the ground surface 142 is limited by reason of the fact that approximately only one-third of the combined weight of the vehicle 10 and of the rider is imposed on the rear wheel 26 against the ground surface 142. The weight on the rear wheel is even less when riding down a steep incline. While conventional hand operated brakes such as conventionally employed in bicycles could be employed to apply braking forces to the dirigible wheels 62 and 64, such conventional braking provisions would involve considerable additional complexity and increased costs of the vehicle 10 in the mounting of wheel rim engaging shoes and the mounting of hand grip brake actuating devices on the handle bar 176. Additionally, such conventional hand actuated braking means, while quite satisfactory with the single front wheel of bicycles would possess the shortcoming with respect to the vehicle 10 in that great care would be required on the part of the rider to impose equal braking forces to the wheels 62 and 64 in order to avoid such braking action tending to cause a turning of the vehicle 10 for the reason that the wheels 62 and 64 are disposed laterally of the center line of the vehicle 10. Accordingly, in preference to the provision of separated hand operated braking devices for each of the dirigible wheels 62 and 64, the vehicle 10 includes supplemental braking means disposed along the center line of the vehicle 10. Such supplemental braking means is designated generally at 194 and comprises a vertically movable brake shoe 196 directly disposed below the frame member 38 and longitudinally in advance, at least in part, of the longitudinal position of the vehicle 10 occupied by the fixed axle or transverse member 16. The brake shoe 196 is provided with a traction element 198 on its undersurface, such traction element 198 including a planar rear portion 200 and being arcuately curved upwardly and forwardly at its forward end as indicated at 202. Conveniently, the traction element 200 can be fabricated from a section taken from the carcass of an automobile tire in the tread region, the traction element 200 being disposed so that the tread portion faces downwardly toward the ground surface 142.

Rigidly fixed to the opposite sides of the brake shoe is a U-shaped memebr 204, such member 204 being spaced above the planar extent 200 of the traction element 198.

The forward end of the member 204 is pivotally connected by a pivot pin 206 to the lower end of a depending hanger 208 or by other suitable means that is rigidly secured as by welding or the like to the bottom portion of the hub structure 210 defining the socket or crank hanger 126. The arrangement is such that the brake shoe 196 is vertically oscillatable about the horizontal transverse axis defined by the pivot pin 206 so as to move as between the full and dashed line showings of the brake shoe 196 in FIGURE 7.

Means is provided for controlling the vertical position occupied by the brake shoe 196. Such means comprises the provision of a transversely extending horizontal pivot pin 212 through the member 204, and parallelly spaced pairs of toggle links 214 and 216 are connected between the pivot pin 212 and the previously described bolt 152 of the clamp 150. The lower ends of the parallel toggle links 214 are pivotally mounted upon the pivot pin 212 on the opposite sides of the brake shoe 196 and are retained on the pin 212 by nuts 218 threaded upon the opposite ends of the pivot pin 212. The parallelly spaced upper toggle links 216 are integrally joined by a web 220 along their upper rear edges from a position adjacent the pivot constituted by the bolt 152, such web 220 projecting for a reason hereinafter set forth downwardly from the lower ends of the upper toggle links 216. The web 220 serves to laterally reinforce the toggle linkage, and to maintain the spacing of the upper links 216. A pivot pin constituting the central pivot 222 of the toggle linkage pivotally extends through the lower ends of the toggle links 216 and also through the upper ends of the toggle links 214, the upper ends of the toggle links 214 being disposed on the opposite sides of the toggle links 216.

Figure 7:
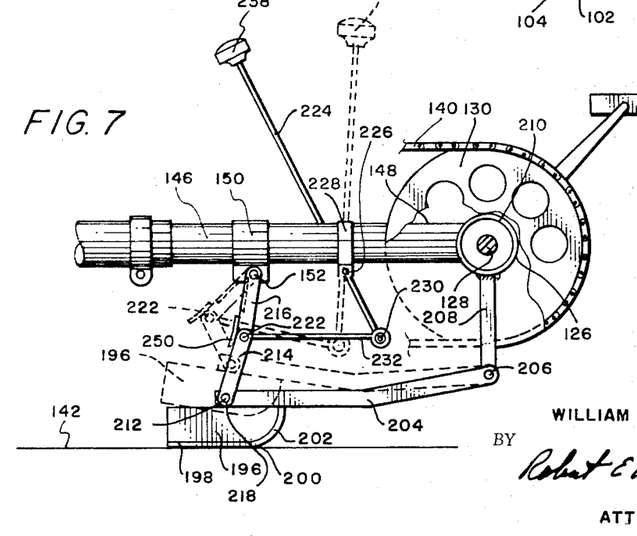
FIGURE 7 is an enlarged fragmentary view, partially in section, taken upon the plane of the section line 7—7 in FIGURE 3, illustrating the brake shoe and control therefor in the parked or locked condition in full lines and in retracted condition in dashed lines.
Figure 8:
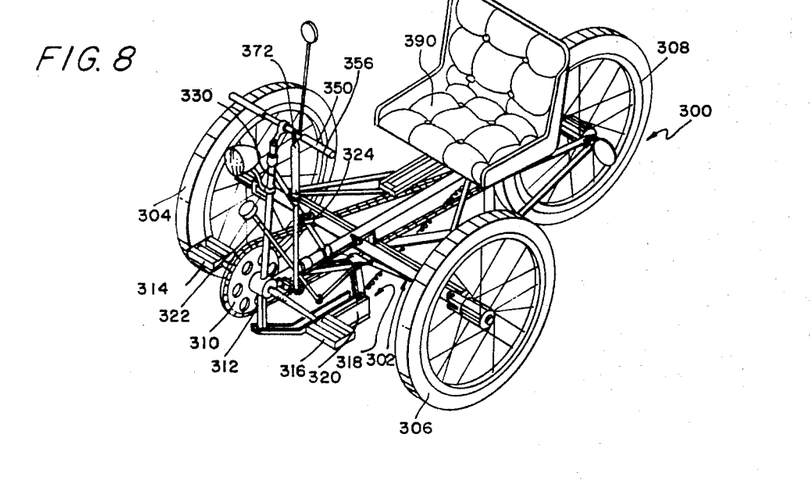
FIGURE 8 is an isometric view of another embodiment of the vehicle, this embodiment providing handle bar steering which may be employed in lieu of or in addition to the joy stick and seat steering structure shown in FIGURES 1–7.
Figure 9:
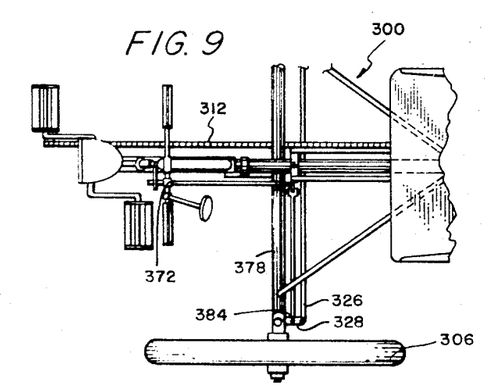
FIGURE 9 is a fragmentary top plan view of the vehicle shown in FIGURE 8 and illustrating the modified steering arrangement.
Figure 10:
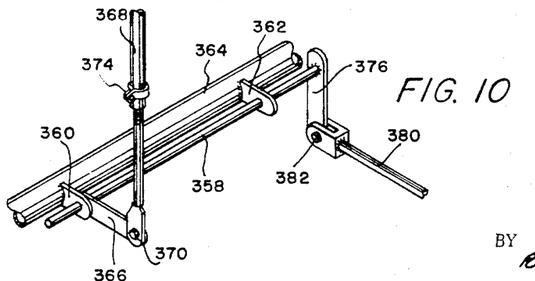
FIGURE 10 is an enlarged fragmentary isometric view of the rock shaft and its connections to other parts of the modified steering arrangement; and, FIGURE 11 is an enlarged fragmentary detail view, partially in section, of the oscillatable mounting of the handle bar.
Figure 11:
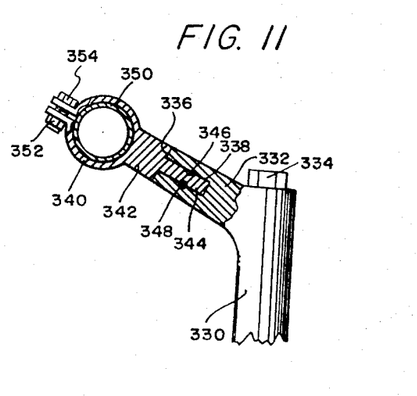

As thus far described, it will be evident that forward and rearward movement of the central pivot 222 will vary the overall vertical extent of the toggle linkage constituted of the pairs of links 214 and 216, and therefore serve to raise and lower the brake shoe 196. It will be evident that the mechanical advantage in forcing vertical movement of the brake shoe 196 is very great with respect to a horizontally applied force to the central pivot 222, such mechanical advantage becoming particularly great as the central pivot 222 approaches or is passing through a dead center position such that the central pivot 222 is in alignment or coplanar with the pivotal axes constituted by the pivotal connections at 212 and 152. In FIGURE 7, the central pivot 222 is shown in the full line showing of the toggle linkage as being disposed slightly forward of the dead center position thereof, and in the dashed line showing of such toggle linkage, the center pivot 222 is shown disposed to a somewhat greater extent rearwardly of the dead center position.

Means is provided for actuating forward and rearward movement of the central pivot 222, such means taking the form of a brake lever 224 pivotally mounted on the clamping bolt 226 of the clamp 228 adjustably secured along the section 148 of the frame member 38 for swinging movement about a transverse horizontal axis. The pivotal connection thereby provided for the lever 224 to the vehicle frame is intermediate the longitudinal extent of the brake lever 224, and the lower end of the lever 224 is pivotally connected at 230 to the forward end of a brake actuating link 232. The brake actuating link 232 extends rearwardly from its pivotal connection at 230 and has its rearmost extremity pivotally mounted on the central pivot 222. The toggle linkage constituted of the links 214 and 216 as well as the brake actuating link 232 are retained on the pin 234 constituting the central pivot 222 by means of nuts 236 threaded on the opposite extremities of the pin 234. The upper end of the brake actuating lever 224 is provided with a hand knob 238 by means of which the rider may readily move the upper end of the lever 224 forwardly and rearwardly as desired. Inspection of FIGURE 7 will make it readily apparent that rearward movement of the central pivot 222 is ultimately limited by engagement of the underside of the frame section 146 being engaged by the web 220 of the upper toggle links 216. With the toggle linkage collapsed to such an extent corresponding to engagement of the web 220 with the frame, further upward movement of the brake shoe 196 which accompanies such rearward movement of the central pivot 222 is positively limited. In the preferred construction such limited position of upward movement of the brake shoe 196 occurs at such a height above a plane tangent to the bottom of all three wheels 26, 62 and 64 that the vehicle must be rocked forwardly about the positions of ground contact of the dirigible wheels 62 and 64 in order to bring the brake shoe 196 into ground contact, and the parts are so proportioned and arranged that such rocking movement sufficient to bring the brake shoe 196 into contact with the ground surface 142 is not sufficient so as to bring any other portion of the vehicle 10 into contact with the ground surface 142 other than the brake shoe 196. In other words, when the brake shoe 196 is in its uppermost limited position corresponding to the knob 238 being disposed in a forwardly position, the entire vehicle 10 is disposed above a plane tangent to the bottoms of the dirigible wheels 62 and 64 and the brake shoe 196. This feature has been found to be of considerable convenience in that it enables a rider mounting or dismounting from the vehicle 10 with greater ease. This function will be evident when it is realized that with the brake shoe 196 disposed in such upper limited position, a person desiring to mount the vehicle 10 can press downwardly upon the handle bar 176 with sufficient force to rock the vehicle 10 forwardly to bring the brake shoe 196 into contact with the ground surface 142 with consequent raising of the rear wheel 26 above the ground surface 142. With the vehicle 10 thus rocked forwardly it is more convenient for the rider to move a leg into a position over the frame member 38 so as to straddle the latter and to bring his posterior region into engagement with the seat 52, whereupon the rider allows the vehicle 10 to rock into its initial position with the ground wheel 26 in engagement with the ground surface 142. Conversely, a rider seeking to dismount from the vehicle 10 removes his feet from the pedals 136 and 138 and then presses downwardly upon the handle bar 176 to force the brake shoe 196 into engagement with the ground surface 142, whereupon he can readily move forwardly from the seat 52 and step over the lowered frame member 38 to clear himself from the vehicle 10 whereupon the latter is allowed to resume its normal position. It is to be noted that when the brake shoe 196 is brought into ground contact as previously described, the position of the brake shoe 196 forwardly of the centers of the dirigible wheels 62 and 64 insures a stable three-point support for the vehicle 10 in such attitude. The function of the vehicle 10 just described may be considered somewhat analogous to that achieved in connection with trained riding camels, in that animals of such type are trained to kneel for the convenience of a rider in mounting as well as in dismounting from the animal. Accordingly, the function of the vehicle 10 just described may be termed the "kneeling camel effect."

If desired, the web 220 can be provided with an upstanding stop flange (not shown) of such height as may be desired to attain whatever degree of angular forward rocking movement found most suitable to the user in the enjoyment of the "kneeling camel effect."

Alternatively, rather than the provision of an upstanding stop flange on the web 220, a stop member can be dependingly secured to the underside of the frame section 146 by a split clamp, it being evident to those skilled in the art that such a depending stop can be disposed in the travel path of the web 220 so as to positively limit upward swinging movement of the links 216 and consequently positively limit upward movement of the brake shoe 196, thus causing the brake shoe to strike the ground before the front sprocket does when the vehicle is tilted forward.

Means is provided for yieldingly urging upward swinging movement of the brake shoe 196 about its pivotal connection at 206, and such spring means can conveniently take the form of an elongated coiled tension spring 240 having its opposite ends secured to the brake shoe 196 and the upper end of the tubular frame member 18, such spring 240 being disposed on the side of the frame member 38 opposite the drive chain 140. Accordingly, whenever the center pivot 222 is disposed rearwardly of its dead center position and no other opposing force is opposed upon the brake lever 224, the brake shoe 196 will be raised to its upper limited position with corresponding movement of the knob 238 to a correspondingly limited forward position. Normally when the vehicle 10 is in use the brake shoe 196 and the brake lever knob 238 will occupy their respective upper limited and forward positions. When it becomes necessary for the rider of the vehicle 10 to obtain a greater braking force than is desirable or obtainable from the rear wheel 26, the rider pulls the knob 238 rearwardly from its forward limited position with the result that the brake actuating link 232 moves the central pivot 222 forwardly, and such forward movement of the central pivot 222 results in extending the length of the toggle linkage until such time as the central pivot 222 reaches its dead center position. The relationship of the parts is such that prior to the knob 238 being pulled rearwardly to an extent such as to move the central pivot 222 to its dead center position, the bottom of the brake shoe is brought into engagement with the ground surface 142. The rider can control the degree of force with which the brake shoe 196 is forced downwardly into engagement with the ground surface 142 and therefore the braking effect obtained by such friction or traction engagement. It will be noted that with progressively greater rearward force on the knob 238 the rider progressively transfers weight carried by the dirigible wheels 62 and 64 to the brake shoe 196. Therefore, the rider can with a fine degree of control transfer any desired proportion or the entirety of the weight normally carried by the dirigible wheels 62 and 64 to the braking shoe 196, such nicety of control being made possible by the relatively small vertical movement of the brake shoe 196 in relation to the forward movement of the central pivot 222 as the latter approaches its dead center position. Such nicety of control is further enhanced by the extent of the lever 224 between the pivot 226 and the knob 238 being much greater than the spacing of the pivotal connections 226 and 230. Clearly, a very considerable rearward movement of the control knob 238 must be made in order to effect very small changes in the vertical position occupied by the brake shoe 196, especially when the central pivot 222 is approaching its dead center position.

It will be evident that only under the most extreme emergency conditions will the rider pull the brake knob 238 rearwardly to such an extent that virtually the entire weight of the vehicle 10 is carried by the rear braking wheel 26 and the brake shoe 196, and that for any lesser degree of rearward pull or movement of the brake control knob 238, the rider can maintain a very large degree of directional control of the vehicle 10 by appropriately steering the dirigible wheels 62 and 64.

A very important advantage of the braking system afforded by the combination of the braking function of the rear wheel 26 and the brake shoe 196 is that all braking or retarding forces are in the longitudinally plane of the vehicle 10 and of its rider, and consequently, no turning torque will result from the application of the combined braking system. In the event that turning does occur to any extent, the vehicle 10 will tend to place some weight upon such of the dirigible wheels 62 and 64 that is on the outside of such turn, with the result that such dirigible wheel in contact with the ground will enable the rider to exert a corrective steering effort.

As mentioned previously the braking action described above occurs prior to the brake knob 238 being moved rearwardly to an extent sufficient to move the central pivot 222 to its dead center position, and in the preferred construction considerable rearward movement of the brake control knob 238 must be made from the time that the brake shoe 196 is disposed below a plane tangent to the undersides of the wheels 26, 62 and 64 prior to the central pivot 222 being moved forwardly to reach its dead center position. Such dead center position of the central pivot 222 corresponds to the maximum downward movement of the brake shoe 196, this being for the reason that the toggle linkage is of its greatest extent when the central pivot 222 is in its dead center position. The brake control knob 238 can be moved rearwardly of the position occupied thereby when the central pivot 222 is in its dead center position, it being noted that such further additional movement of the brake knob 238 is accompanied by a shortening of the extent of the toggle linkage and by a corresponding rising movement of the brake shoe 196. Means is provided for limiting forward movement of the central pivot 222 to such a position that the brake shoe 196 is disposed below a plane tangent to the undersides of the wheels 26, 62 and 64, such limiting means preferably taking the form of the web 220 of the toggle linkage being downwardly extended from the lower ends of the toggle links 216 and such downwardly extending portion of the web 220 being transversely enlarged at 250 so that the transversely enlarged portion 250 of the web 220 engages the rear upper edges of the toggle links 214 when the central pivot 222 has been moved forwardly of its dead center position to that shown in full lines in FIGURE 7. It will be noted that when the central pivot 222 is disposed forwardly of the dead center position thereof, the toggle linkage will be actuated by means of the spring 240 so as to urge the central pivot 222 to its forward limited position in the absence of the application of any external force to the brake lever 224. Such forward movement of the central pivot 222 actuated by the spring 240 is augmented by any extent to which the weight of the vehicle 10 is brought to bear against the ground surface 142 by the brake shoe 196. It is essential to the achievement of a function now to be described that the brake shoe 196 occupies a position below the plane tangent to the bottoms of the wheels 26, 62 and 64 when the central pivot 222 is disposed in its forward limited position as described above; however, it is preferred that the brake shoe 196 extend only a short interval below such plane for reasons to be presently explained.

When it is desired by the rider of the vehicle to park the vehicle 10 or that the vehicle 10 be stopped, whether occupied by the rider or not, in such a manner as to not be free to roll, the rider simply moves the brake lever knob 238 rearwardly to a sufficient extent that the central pivot 222 reaches its forward limited position. This results in the brake shoe 196 being disposed in a position such as to be in contact with the ground and to preclude the vehicle 10 from rolling from the position in which it is stopped or parked. When the vehicle 10 is thus parked or stopped with the brake shoe 196 in contact with the ground surface 142, one or the other of the two dirigible wheels 62 and 64 is raised from the ground surface 142, the vehicle 10 being rockable to at least some extent about an axis defined by the positions at which the rear wheel 26 and the brake shoe 196 contact the ground. It is preferred that such rocking be of a limited extent so as to not be an annoyance to a rider who may be seated on the parked or stopped vehicle.

It is to be expressly noted that when the vehicle has its brake shoe 196 in contact with the ground surface 142 as previously described in connection with the stopped or parked condition of the vehicle 10 that the vehicle 10 can neither be driven nor conveniently moved, inasmuch as such movement will virtually necessitate the entire front end of the vehicle 10 being raised from the ground surface 142 in order to avoid the retarding effect of engagement of the brake shoe 196 with the ground surface 142. Such function affords a particularly convenient and effective for securing or at least greatly reducing any likelihood of theft or unauthorized operation of the vehicle. Such means for securing the vehicle 10 against theft or unauthorized operation conveniently takes the form of a U-shaped keeper 260 (see FIGURE 3) fixed by welding or the like to the brace 160 adjacent the lower end of the latter. The U-shaped keeper 260 opens forwardly so as to receive therein the brake lever 224 when the latter is moved rearwardly to a position corresponding to the brake shoe 196 being disposed in ground contact with the central pivot 222 being in its forwardmost position. When the brake lever 224 is received within the U-shaped keeper 260, a conventional padlock can be secured to embrace both the keeper 260 and the brake lever 224 disposed therein, whereby the lever 224 can be moved forwardly only upon opening of the padlock, not shown, and removal of the same from a position embracing the lever 224 and the keeper 260. If desired, the forward ends of the U-shaped keeper 260 can be apertured so that a conventional locking device may be passed through the aligned apertures, not shown, and releasably locked in such condition to prevent forward movement of the brake lever 224 until such locking device is unlocked and removed from the keeper 260. An important advantage of the locking system described resides in the fact that efforts to move the vehicle 10 when it is locked are not likely to cause damage to the vehicle 10. It will be noted that many conventional locking systems for bicycles or the like entail the passing of a locking device through the spokes of a wheel with the result that attempts of a thief to move the bicycle can readily cause damage to the spokes of the wheel.

It is believed from the foregoing that the operation and use of the vehicle 10 will be readily comprehended by those having any familiarity with the art. When the vehicle 10 is unlocked and the brake lever knob 238 has been swung to its forward position, a rider can readily mount the vehicle 10 utilizing the kneeling camel effect if desired. After having mounted the vehicle 10, the rider places his feet on the pedals 136 and 138 and grasps the handle bar 176 with either one or both hands. If desired, releasable pedal straps, not shown, can be provided for the pedals 136 and 138 whereby additional leg power can be delivered. Such additional power is obtained by retractive movement of the foot. The pedal straps enable the rider to deliver torque throughout most of the cycle of movement of each pedal. The rider may then propel the vehicle forwardly, while employing to advantage in the application of force to the pedals 136 and 138 the rigid mounting of the handle bar 176 and the provision of the sturdy back 144 of the bucket-type seat 52. While propelling the vehicle 10 forwardly, the rider can steer the vehicle 10 by twisting his body upon the seat 52 and/or by use of the steering lever 80. In any event, whether the steering force is applied directly to the seat 52 or to the lever 80, the rider will be turned in the direction towards which the vehicle is being steered. When the rider desires a normal degree of braking, he simply applies forces against the pedals 136 and 138 such as to urge rotation of the driving sprocket 130 in a direction opposite to the direction that the sprocket 130 is driven for forward propulsion of the vehicle 10, and thereby effects the desired degree of braking through the rear wheel 26. When the rider desires to coast, this is accomplished by simply refraining from urging either forward or reverse rotation of the driving sprocket 130, as is conventional in the operation of bicycles.

When the rider is confronted with an emergency situation necessitating extraordinarily effective braking action, this is readily accomplished by the rider grasping the brake lever knob 238 and pulling the same rearwardly to the extent to achieve the desired degree of emergency braking action. At all times, whether driving the vehicle 10 forwardly, coasting, or braking the vehicle 10, control of steering may be effected by use of either the seat or the steering lever 80 or a combination of both, it being noted that the dirigible wheels 62 and 64 are never subjected to any braking action and therefore can more reliably impart the desired degree of steering effect.

While the relatively simple form of the invention thus far described affords two ways or any desired combination of two ways (seat 52 and the joy stick or lever 80) to steer the same, such relatively simple form of the invention thus far described can be modified to include yet a third way to steer the vehicle which third way can independently or in any desired combination of coordinated effort with one or both of the two other ways be used to steer the vehicle.

It is apparent that the two ways or steering controls already described have in common the tie rod and the extent of the lever 80 intermediate the tie rod and the link 116. If desired or deemed expedient, the extent of the lever 80 above its connection to the link 116 can be eliminated so that steering can be effected by only the seat 52, or alternatively, the link 116 can be omitted (and the seat 52 secured against oscillation if desired) in which event steering can only be effected by the lever 80.

The third way of steering which will presently be described also involves the tie rod and can actuate the latter independently of or jointly with the seat 52 and/or the lever 80. The third way of steering is illustrated separately from the other two ways for the reasons that the latter does not require the handle bar to be pivotally mounted and because illustration of the third way would tend to obscure illustration of the two ways already described.

Attention is now directed to the embodiment of the invention shown in FIGURES 8 through 11 wherein the third steering means is shown, this embodiment of the vehicle being designated generally at 300. The vehicle 300 is essentially the same as the previously described vehicle 10 and no detailed description thereof is deemed necessary as it will suffice for the purposes of a full and complete understanding thereof to point out in detail the differences existing between the vehicles 10 and 300. At the outset the distinctions existing between the vehicles 10 and 300 reside basically solely in the provision of a supplementary or alternative steering system. The vehicle 300 can, if desired or deemed expedient, include the seat and lever (joy stick) steering provision indicated in the vehicle 10.

The vehicles 300 includes a frame 302 that is identical to the previously described frame of the vehicle 10, excepting only a specifically different handle bar construction to be described subsequently. Additionally, the vehicle 300 includes dirigible wheels 304 and 306 that are identical to and mounted upon the vehicle frame 302 in the same manner as in the case of the dirigible wheels 62 and 64 of the vehicle 10. The vehicle 300 includes a rear wheel 308 identical to the previously described wheel 26 of the vehicle 10, such rear wheel 308 being arranged to be driven, allowed to coast and brake by means including a driving sprocket 310, drive chain 312, and foot pedals 314 and 316 that respectively correspond to the previously described corresponding parts of the vehicle 10.

Additionally the vehicle 300 includes a brake shoe braking and parking system designated generally at 318 that is identical to that previously described in connection with the vehicle 10, the system 318 including a brake shoe 320, a brake lever 322 and a keeper 324 that correspond respectively to the previously described parts of the vehicle 10 designated at 196, 224 and 260.

Furthermore, the steering system of the vehicle 300 includes a steering bar tie rod 326 that is operatively associated with and connected to the dirigible wheels 304 and 306 in precisely the same manner as in the case of the steering rod or tie rod 74 and its relationship to the dirigible wheels 62 and 64 of the vehicle 10. The operative connection of the tie rod 326 to the dirigible wheels 304 and 306 includes a steering knuckle 328 which corresponds to the steering knuckle 68 in the vehicle 10. The seat of the vehicle 300 can be operatively connected for steering control purposes to the tie rod 326 in the same manner as the seat of the vehicle 10 is connected to the tie rod 74, such connection being by way of a common steering lever as in the case of the vehicle 10. Such additional steering means is not shown as included in the vehicle 300 as illustration thereof would merely serve to obscure the handle bar steering system emphasized in the vehicle 300.

As thus far described, it will be evident that movement of the steering tie rod 326 to the right relative to the vehicle frame 302 effects a steering movement of the dirigible wheels 304 and 306 such as to result in a turning of the vehicle 300 to the left, and conversely, movement of the steering tie rod 326 to the left results in a steering movement of the dirigible wheels 304 and 306 such as to steer the vehicle 300 to the right.

As mentioned above, an alternative or supplemental means is employed in the vehicle 300 for effecting endwise movements of the steering tie rod 326 so as to control the steering of the vehicle 300, which can operate in correlation with the aforementioned seat and hand lever steering of the vehicle 10. Such entirely different but interconnected means for effecting endwise steering movements of the steering tie rod 326 will now be described.

The vehicle 300 includes an upstanding support or column 330 which corresponds to the column 156 of the vehicle 10; however, the column 330 is not provided a handle bar bracket of the character indicated at 170 in connection with the vehicle 10. Rather, a bracket or oscillatable handle bar mounting means 332 is fixed to the upper end of the column 330 by means of a cap screw 334 extending through the bracket 332 and into the upper end of the column 330. From its position of rigidly fixed connection to the upper end of the column 330, the bracket 332 extends in generally cylindrical form upwardly and rearwardly to terminate in a free end 336 (see FIGURE 11). A cylindrical recess 338 is provided in the free end 336 of the bracket 332, such cylindrical recess 338 being axially disposed in the bracket 332. A handle bar clamp 340 is provided having a lateral projection 342, and the outer end portion of the projection 342 is reduced in diameter and rotatably received within the cylindrical recess 338. The reduced outer end portion 344 of the clamp projection 342 is prevented or denied withdrawal from within the recess 338 by means of a split ring spring 346 seated in opposed annular grooves 348 formed in the recess and in the reduced portion 344 of the clamp projection 342.

As thus far described, the clamp 340 is rotatable or oscillatable about an axis inclined upwardly and rearwardly from the upper end of the handle bar support column 330.

The clamp 340 receives transversely therethrough the central portion of a transversely extending handle bar 350. The clamp 340 is generally similar to the clamps previously described in connection with the vehicle 10 and is of the split collar type including a nut 352 and bolt 354 by means of which the clamp 340 may releasably secure the handle bar 350 in a manner such as to be immovable with respect to the clamp 340.

Inasmuch as the handle bar 350 is mounted for rotation or oscillation about an axis having a substantial horizontal component, and indeed if desired the axis of rotation or oscillation of the handle 350 can be perfectly horizontal, it will be evident that the left hand portion 356 of the handle bar 350 will move upwardly and downwardly during oscillation of the handle bar 350. Means is provided for effecting endwise movement of the tie rod 326 in response to raising or lowering movement of the left hand portion 356 of the handle bar 350. Such means comprises a horizontal rock shaft 358 journaled through ears 360 and 362 fixed to the longitudinally extending central portion 364 of the frame 302. The arrangement is such that the rock shaft 358 has a horizontal longitudinally extending axis disposed laterally to the left of the median plane of the vehicle 300, it being noted that the bracket 332 is disposed in such medial plane.

Means is provided for rocking the rock shaft 358 in response to oscillation of the handle bar 350, such means comprising an arm 366 rigidly fixed to and extending radially from the rock shaft 358, the arm 366 being arranged so as to be disposed horizontally when the handle bar 350 is horizontal (by which is meant that the central portion of the handle bar 350 is horizontal). A link 368 has its lower end pivoted to the outer extremity of the arm 366 at 370, and the upper end pivotally connected to the left hand handle bar portion 356 at 372, it being noted that the pivotal connection 372 is spaced laterally from the medial plane of the vehicle 300, the arrangement being such that the pivotal connection 372 moves upwardly and downwardly as the handle bar 350 is oscillated about its horizontal position. Inasmuch as the pivotal connection 370 as well as the rock shaft 358 are disposed to the left of the medial plane of the vehicle 300, downward movement of the left hand portion 356 of the handle bar 350 imparts a downward movement to the pivotal connection 370 and consequently a clockwise rocking movement of the rock shaft 358 as viewed from the front of the vehicle 300. Conversely, upward movement of the left hand portion 356 of the handle bar 350 imparts anticlockwise rocking movement to the rock shaft 358 as viewed from the front of the vehicle 300. In the preferred construction the link 368 is of telescoping character so as to be adjustable in length, and conventional means indicated at 374 is provided for securing the link 368 at any selected adjusted length. Such adjustability permits fore and aft adjustment for different sized riders.

Means is provided for effecting endwise movement of the steering rod or bar 326 in response to rocking movement of the rock shaft 358. Such means comprises an arm 376 rigidly fixed and extending radially downwardly from the rock shaft 358 as clearly shown in FIGURE 10. The length of the rock shaft 358 is such that the arm 366 is disposed substantially directly below the handle bar 350 with the arm 376 being disposed rearwardly of the fixed axle or frame member 378, it being noted that the frame member 378 corresponds to the frame member 16 of the vehicle 10. A link 380 approximately parallels the tie rod 326 in spaced relationship thereto, and has one end pivotally connected at 382 to the lower outer end of the rock shaft arm 376, with the other end of the link 380 being pivotally connected at 384 to the steering knuckle 328.

As will be evident the tie rod 326 and the rod 380 can be connected to the knuckle 328 by a common pivot rather than separate pivots. The arrangement is such that rocking movement of the rock shaft 358 about the position shown thereof in FIGURE 10 will impart an endwise movement to the link 380, with the link 380 communicating such endwise movement to the tie rod 326 by virtue of the pivotal connections of the link 380 and the tie bar 326 to the steering knuckle 328.

The operation of the steering means of the vehicle 300 will be readily understood. Upon the rider of the vehicle 300 rocking or oscillating the steering bar 350 to the left as viewed from the rider's position, the left hand portion 356 of the handle bar 350 will be moved downwardly, such downward motion causing through the agency of the link 360 and the arm 366 a rocking movement of the rock shaft 358 in a clockwise direction as viewed from the front of the vehicle 300. Such direction of rocking movement of the rock shaft 358 will cause movement of the pivotal connection 382 to the right, whereupon the tie bar 326 is caused to move to the right with resulting movement of the dirigible wheels 304 and 306 such as to turn the vehicle to the left. Conversely, rocking or oscillation of the handle bar 350 to the right as viewed by the rider will result in the dirigible wheels 304 and 306 being turned in such a manner as to turn the vehicle 300 to the right.

Though the vehicle 300 is not shown as including a steering lever connected to the steering rod 326 such as to correspond to the steering lever 80 of the vehicle 10, it will be recognized that the provision of such a steering lever in association with the vehicle 300 is not only compatible with the vehicle 300, but is preferred that the tie rod 326 be provided with the steering lever 80, link 116 and oscillatable seat 52 of the vehicle 10, though such provision is not essential. It is entirely optional whether the seat 390 be oscillatable or not if operative steering coupling of the seat 390 to the tie rod 326 is to be omitted. If it is desired that the seat 390 be denied oscillation about any vertical axis, the telescoping portions of the resilient support of the seat 390 such as those described in connection with the vehicle 10 can be non-circular so that rotation of such telescoping sections is prevented.

It has been explained that the rigid handle bar of the first described embodiment of the invention furnishes the rider with a good anchorage for both turning his seat 52 and for moving the pedals. It is emphasized that additionally providing the vehicle 10 with the handle bar steering structure of the vehicle 300 (as is preferred) does not impair such functions inasmuch as the handle bar of the vehicle 300 is pivoted about a substantially horizontal axis (in fact, such axis can be strictly horizontal) and consequently very little, if any, fore and aft movement of the handle bar occurs with the result that the rider can use the pivoted handle bar to facilitate both driving the pedals and in turning the seat 52.

In summary, the illustrated and described invention enables realization of the following beneficial results: (1) practically equal weight distribution on all three wheels with low center of gravity for optimum stability; (2) short, narrow, compact, light, strong and inexpensive structure; (3) optimum seat height in relation to foot crank for optimum rider position to utilize both the seat back and handle bars to augment foot thrust; (4) optimum maneuverability and minimum turning radius; (5) optimum comfort and safety; (6) optimum braking; (7) optimum mounting and dismounting ease, enhanced by "kneeling camel" effect; (8) minimum frontal area for less wind resistance; (9) this vehicle can be radily converted to a light, inexpensive automobile with the simple addition of a bicycle engine presently available to the bicycle trade; and (10) by modification of the central frame portion, this vehicle can be readily converted to an electric automobile.

It will be manifest that each of the illustrated and described embodiments of the invention is susceptible to numerous and various modifications without departing from the spirit of the invention, and the very detailed descriptions of the embodiments have been prompted solely in the interests of conveying a full and complete understanding of the principles involved and any narrowness in scope of the invention is not to be implied by such explicit and detailed descriptions. Accordingly, attention is directed to the appended claims in order to ascertain the actual scope of the inevntion.

I claim:

1. In a tricycle vehicle of the type comprising a frame, freely rotatable laterally spaced front wheels dirigibly mounted by pivotally secured stub axles on the frame, a rear wheel centrally mounted on the rear of the frame, a forwardly facing rider seat mounted on the frame, rider actuated means for driving the rear wheel, and rider actuated means for steering the dirigible front wheels; the improvement comprising the frame centrally projecting forwardly of the stub axles, said means for driving the rear wheel comprising a driven sprocket coaxial with and operatively connected to the rear wheel, a driving sprocket rotatably mounted on the forward extremity of the frame, said driving sprocket being provided with foot pedal cranks, a drive chain entrained over the sprockets, and a brake shoe pivotally connected for vertical movement in depending relation to the frame at a position forwardly of the stub axles, means for actuating and controlling the vertical position of the brake shoe, said frame including an upstanding central portion disposed at a position rearwardly of the driving sprocket, and a handle bar carried at the upper end of the upstanding portion of the frame.

2. The combination of claim 1, wherein the means for actuating and controlling the vertical position of the brake shoe comprises a toggle linkage including a center pivot connecting the brake shoe and the frame, and a brake lever pivotally connected to the frame and pivotally connected to said center pivot, whereby the brake shoe can be moved above and below a plane defined by the lowermost extents of the wheels.

3. The combination of claim 2, wherein the lever is movable between first and second positions through an intermediate position, said brake shoe, toggle linkage and lever being so constructed and arranged that the brake shoe is disposed above said plane when the lever is in its first position and moves downwardly through said plane as the lever travels through an intermediate portion of its travel from its first to its intermediate position, said toggle linkage having a dead center position corresponding to the lever being at its intermediate position, said brake shoe being below said plane when the lever is at and between its intermediate and second positions, and means for limiting movement of the lever to movement between its first and second positions.

4. The combination of claim 3, wherein the operative connection of the driven sprocket to the rear wheel includes means responsive to rearward rotation of the driven sprocket to brake the rear wheel.

5. The combination of claim 3, including provision for curtailing unauthorized movement of the vehicle comprising means for releasably locking the lever in a position corresponding to the shoe being below said plane.

6. The combination of claim 5, wherein the position at which the last recited means releasably locks the lever is the second position of the latter.

7. The combination of claim 3, wherein a tangent plane is defined by the undersides of the front wheels and the shoe when the latter is in its position corresponding to the lever being in its first position, with said vehicle being in its entirety disposed above said tangent plane, with the first mentioned plane and the tangent plane defining an acute dihedral angle of less than about 45°, whereby the vehicle can be rocked forward and be stably supported on a supporting ground surface to facilitate rider mounting and dismounting.

8. The combination of claim 3, including resilient means yieldingly urging upward movement of the shoe.

9. The combination of claim 3, wherein the rider actuated means for steering the dirigible front wheels includes a horizontal, transversely extending tie rod having its opposite ends operatively connected to the stub axles of the front wheels, and means for imparting endwise movement to the tie rod to effect steering, said last means comprising an upstanding steering lever pivotally mounted on the frame for transverse oscillation about a horizontal axis, and said lever being pivotally connected to the tie rod.

10. The combination of claim 9, wherein the tie rod is disposed rearwardly of the stub axles of the front wheels and below the horizontal axis of the steering lever.

11. The combination of claim 9, wherein the seat is mounted on the vehicle for oscillation about a vertical axis, and linkage means operatively connecting the seat to the tie rod for causing endwise steering movement of the latter on movement of the seat about its vertical axis, whereby the rider can steer the vehicle selectively by use of the steering lever, joint use of the steering lever and the seat, and by the seat, and whereby the seat will at all times be turned to face generally toward the direction toward which the vehicle is being steered.

12. The combination of claim 3, wherein the rider actuated means for steering the dirigible front wheels includes a horizontal, transversely extending tie rod having its opposite ends operatively connected to the stub axles of the front wheels, and means for imparting endwise movement of the tie rod to effect steering, said last means comprising the seat being mounted on the frame for oscillation about a vertical axis, and linkage means operatively connecting the seat to the tie rod for causing endwise movement of the tie rod on movement of the seat about its vertical axis.

13. The combination of claim 3, wherein the rider actuated means for steering the dirigible front wheels includes a horizontal, transversely extending tie rod having its opposite ends operatively connected to the stub axles of the front wheels, and means for imparting endwise movement to the tie rod to effect steering, said last means comprising said handle bar being oscillatably secured to the upstanding portion of the frame for movement about a handle bar axis, and linkage means operatively connecting the handle bar to the tie rod to move the latter in one endwise direction in response to movement of the handle bar in one direction about its axis.

14. The combination of claim 13, wherein said linkage means comprises a longitudinally extending rock shaft journaled on the frame, a radially extending arm fixed on the rock shaft and pivotally connected to the tie rod, a second radially extending arm fixed to the rock shaft, and a link having its opposite ends pivotally connected to the handle bar and the second arm.

15. The combination of claim 13, wherein said seat is fixed to a depending elongated first member, an upstanding second member fixed to the frame, one of said members being tubular and rotatably and extensibly receiving the other to define the vertical axis, and a compression spring received in said one member and operatively engaging both of said members to yieldingly support the seat.

16. The combination of claim 1, wherein the front and rear wheels are all of substantially the same diameter, with the centers of such wheels being disposed at the apices of an isosceles triangle, the rear wheel being at an apex defined between sides of the triangle of equal length, said triangle having an altitude length closely approximating the length of its base defined by the spacing of the centers of the front wheels, whereby the vehicle has a tread width substantially equal to its wheel base, said seat being centered at a longitudinal position lying between the rear wheel and the centroid of the triangle.

17. A vehicle comprising a frame of generally cruciform configuration relative to the horizontal plane, said frame including an elongated longitudinally extending central portion having fixed thereto, at a position intermediate its longitudinal extent, an elongated transversely extending cross portion, stub axles pivoted to the transverse extremities of the cross portion of the frame for swinging movement about vertical axes, a pair of front wheels mounted on the stub axles, said stub axles each being provided with a steering knuckle and a transversely extending tie rod having its opposite ends pivotally connected to the steering knuckles in an arrangement such that steering of the front wheels is effected by endwise movements of the tie rod relative to the frame, a rear wheel rotatably mounted on the rear extremity of the center frame, a driven sprocket coaxial with the rear wheel and operatively connected thereto, a driving sprocket rotatably mounted on the forward extremity of the center frame, an endless chain entrained over said sprockets, said driving sprocket being provided with pedal cranks, an upstanding column mounted on the center frame forwardly of the cross portion of the frame, such column being provided with a handle bar at its upper end, a forwardly facing seat mounted on the center frame at a position rearwardly of the cross portion of the frame, said front and rear wheels being of approximately equal diameters and having their centers at the apices of an isosceles triangle, and means for enabling a vehicle rider to effect endwise steering movement of the tie rod.

18. The combination of claim 17, wherein the center portion of the frame includes a longitudinally extensible section forwardly of the cross portion of the frame, whereby the longitudinal spacing of the seat and the driving sprocket can be varied, and means for releasably securing the extensible section in a selected condition of extension.

19. The combination of claim 17, wherein the center portion of the frame includes a vertically inclined tubular member, said seat including a depending member reciprocably received in the tubular member, and a compression spring in the tubular member with the lower end of the depending member bearing against the spring thereby to resiliently support the seat.

20. The combination of claim 17, wherein the means for enabling a vehicle rider to effect steering movement of the tie rod comprises an upstanding steering lever pivoted to the frame for movement about a longitudinal axis, said lever being pivotally connected to the tie rod.

21. The combination of claim 20, wherein the steering knuckles extend rearwardly from the stub axles, and wherein the pivotal connection of the lever to the tie rod is below the pivotal connection of the steering lever to the frame.

22. The combination of claim 17, wherein the means for enabling a vehicle rider to effect steering movement of the tie rod comprises the seat being mounted on the frame for oscillation about a vertical axis, linkage means operatively connecting the seat to the tie rod.

23. The combination of claim 17, wherein the means for enabling a vehicle rider to effect steering movement of the tie rod comprises an upstanding steering lever pivoted to the frame for movement about a longitudinal axis, said lever being pivotally connected to the tie rod, said seat being mounted on the frame for oscillation about a vertical axis, linkage means operatively connecting the seat to the tie rod, whereby the rider may actuate steering movement of the tie rod selectively by use of the lever, by use of the seat, and by combined use of the lever and the seat.

24. The combination of claim 17, wherein said means for enabling a vehicle rider to effect steering movement of the tie rod comprises a longitudinally extending rock shaft mounted on the frame, a radially extending arm on the rock shaft operatively connected to the tie rod, said handle bar being mounted for oscillation about an axis, and means for rocking the rock shaft in response to oscillatory movement of the handle bar about its axis.

25. The combination of claim 24, wherein the last recited means comprises a second radially extending arm on the rock shaft, and an upstanding link having its opposite ends pivotally connected to the handle bar and the second arm.

26. The combination of claim 17, wherein the means for imparting endwise movement to the tie rod to effect steering includes said handle bar being oscillatably secured to the upstanding portion of the frame for movement about a handle bar axis, and linkage means operatively connecting the handle bar to the tie rod to move the latter in one endwise direction in response to movement of the handle bar in one direction about its axis.

27. The combination of claim 23, including a radially extending arm on the rock shaft operatively connected to the tie rod, said handle bar being mounted for oscillation about an axis, and means for rocking the rock shaft in response to oscillatory movement of the handle bar about its axis.

References Cited

UNITED STATES PATENTS

| | | | |
|---|---|---|---|
| 1,500,809 | 7/1924 | Giufri | 280—251 |
| 1,550,133 | 8/1925 | Whitehall | 280—267 |
| 2,481,683 | 9/1949 | Polacek | 280—282 |
| 2,789,831 | 4/1957 | Verik | 280—282 X |
| 2,884,259 | 4/1959 | Snodgrass | 280—234 |
| 3,208,764 | 9/1965 | Holland | 280—266 X |
| 3,231,050 | 1/1966 | Belyeu | 188—5 |
| 3,336,047 | 8/1967 | Burgess | 280—240 |

KENNETH H. BETTS, *Primary Examiner.*

U.S. Cl. X.R.

280—269, 282; 188—5